DYNAMIC CONVERGENCE CIRCUITS

Filed May 22, 1968

INVENTORS
MICHAEL W. HILL &
LAWRENCE E. SMITH
BY William H. Meagher
ATTORNEY

United States Patent Office 3,491,261

Patented Jan. 20, 1970

3,491,261
DYNAMIC CONVERGENCE CIRCUITS

Michael W. Hill and Lawrence E. Smith, Indianapolis, Ind., assignors to RCA Corporation, a corporation of Delaware Filed May 22, 1968, Ser. No. 731,165
Int. Cl. H01j *29/50, 31/00*
U.S. Cl. 315—13 10 Claims

ABSTRACT OF THE DISCLOSURE

Vertical rate dynamic convergence circuit for multibeam color kinescope operates from single voltage source in vertical deflection circuit. Red and green vertical convergence windings, connected effectively in parallel, are driven from both ends with respectively different modifications of input waveform. Drive circuit at one end clips and shapes input wave to provide drive essentially confined to end-of-scan half of vertical trace interval. Drive circuit at opposite end of paralleled windings comprises differentiating circuit producing drive waveform that controls convergence winding current during beginning-of-scan half of trace interval but which is essentially ineffective during end-of-scan half due to nature of operation of the first drive circuit. Master and differential controls of each drive waveform are provided in the circuit. The same pair of drive waveforms are also applied to the blue convergence winding in a circuit arrangement providing a control associated with each drive waveform that permits variation of both amplitude and polarity of the resultant current.

Figure 1:
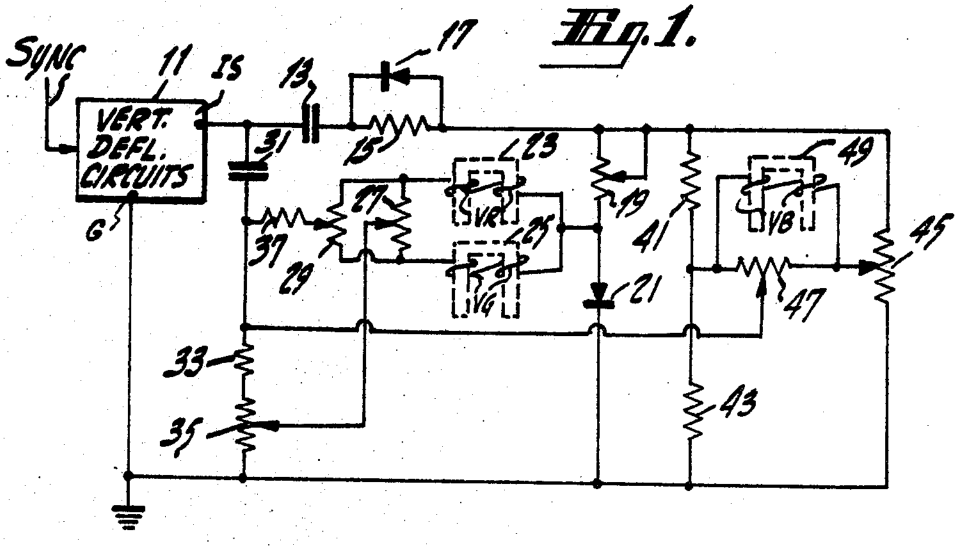

The present invention relates generally to dynamic convergence circuits for a multibeam color kinescope, and particularly to novel and improved vertical rate convergence circuits therefor.

It is customary in color television receivers employing a multibeam kinescope, such as the conventional three-gun, shadow-mask kinescope, to provide dynamic correction of beam misconvergence errors that inhere in the operation of such devices. The nature of the correction requires energization of beam path altering structure with waveforms at both line and field rates. A widely accepted approach to the problem utilizes individual electromagnets associated with internal pole pieces confining their effect to individual ones of the beams, and with separate windings on each electromagnet for respective vertical and horizontal frequency control.

The present invention is directed to convergence circuitry especially suited to development and control of the current in the vertical convergence windings of the above-mentioned electromagnets. A feature of the present invention is the provision of such vertical rate convergence circuits in a form requiring only a single input voltage source. This is in contrast with many prior art circuits that require multiple input voltage sources; typical of such circuits is reliance on inputs from several vertical output transformer secondary windings in addition to a waveform derived, for example, from a vertical output tube cathode circuit. In addition to complicating the coupling structure required between deflection and convergence circuits, the use in such prior art circuits of secondary winding sources enhances the possibility of horizontal interference with vertical deflection circuit operation. The approach of the present invention permits avoidance of the use of output transformer secondary windings as convergence input sources.

It is a practical necessity that the dynamic convergence circuitry of a color television receiver incorporate a set of controls that permit adequate adjustment of the convergence currents to adapt the correction to the particular pattern of misconvergence errors encountered.

In the conventional convergence structure associated with a delta beam arrangement, the beam shifts for red and green are diagonal (involving both vertical and horizontal components of motions) while the beam shift introduced by the blue convergence winding is vertical only; the diagonal axes of red and green beam motion are crossed. As a consequence, similar sense changes in red and green convergence currents introduce opposing horizontal shifts of the red and green beams accompanied by common direction vertical shifts. Conversely, mutually opposed changes in red and green convergence currents introduce opposing vertical shifts of the red and green beams accompanied by common direction horizontal shifts. By interrelating the red and green convergence winding energizations such that both master and differential control of their currents can be effected, the matching of red and green beam landing points can be separated into convenient horizontal line and vertical line alignment adjustments. Convergence adjustment can then be completed by appropriate adjustment of the blue convergence adjustment to complete the horizontal line alignment.

In many of the misconvergence patterns that require correction, the misconvergence at the top of the picture does not match the misconvergence at the bottom of the picture. A practical convergence adjustment arrangement must take this into account by providing some facility for altering end-of-scan waveform magnitude relative to beginning-of-scan waveform magnitude. A difficulty common in prior art circuit arrangements is that controls provided to solve this problem by adjusting, for example, the end-of-scan magnitude relative to a beginning-of-scan magnitude (set by another control) tend to disturb the beginning-of-scan magnitude, requiring readjustment of the other control. A feature of the present invention is the provision of substantial confinement of the effect of each control to a particular half of the picture, whereby correction of a misconvergence pattern may be rapidly achieved without the complication of time-consuming interplay between controls.

In accordance with an embodiment of the present invention, the red and green vertical convergence windings are effectively paralleled and driven at each end with a respectively different modification of a vertical rate waveform derived from a single voltage source in the receiver's vertical deflection circuit. The drive circuit at one end utilizes an arrangement of diodes and resistors to provide drive only during the end-of-scan half of the vertical trace interval. The circuit output appears across a diode which conducts during the beginning-of-scan interval, minimizing the circuit's effect during that period. A second drive circuit supplies a waveform to the opposite end of the paralleled windings. This waveform is effective in controlling winding current during the conduction of the above-mentioned diode (i.e., during the beginning-of-scan half of the trace interval), but has little effect thereon when the diode is open due to the altered impedance of the load. Master and differential controls are associated with each drive circuit, whereby horizontal line alignment and vertical line alignment adjustments may be individually made for top and bottom of the raster.

In further accordance with the invention embodiment, waveforms from each of the red-green drive circuits may be separately and adjustably fed to the blue convergence winding to permit relatively isolated top and bottom blue corrections. An advantageous circuit arrangement permits each of the top and bottom blue controls to alter both the magnitude and polarity of the current waveform.

An object of the present invention is to provide a novel and improved vertical rate dynamic convergence circuit permitting substantially isolated correction of misconvergence errors at raster top and bottom.

A further object of the present invention is to provide a vertical rate dynamic convergence circuit requiring only a single input waveform source.

Other objects and advantages of the present invention will be readily apparent to those skilled in the art upon a reading of the following detailed description and an inspection of the accompanying drawing in which:

FIGURE 1 illustrates schematically a vertical rate convergence circuit for a color television receiver which embodies the principles of the present invention; and FIGURES 2*a*, 2*b*, 2*c* and 2*d* comprise a series of schematic diagrams illustrating a step-by-step development of the FIGURE 1 circuit, and of aid in explaining its operation.

In FIGURE 1, a block 11 represents the vertical deflection circuits of a color television receiver from which is derived an output voltage for use by the convergence circuitry of the invention. This voltage is presented between an output terminal IS and a (grounded) reference terminal G, and, illustratively, is of a partially integrated sawtooth waveshape (see waveform 50 of FIG. 2*a*).

A first drive circuit coupled between source terminals IS and G includes, in series in the order named: (1) a (relatively large valued) coupling capacitor 13; (2) a shaping network comprising the parallel combination of a fixed resistor 15 and a diode 17; (3) a variable resistor 19; and (4) a diode 21. The diodes 17 and 21 are oppositely pole in the series circuit.

A second drive circuit coupled between source terminals IS and G comprises a C–R differentiating circuit, and includes, in series in the order named: (1) a capacitor 31; (2) a fixed resistor 33; and (3) the resistance element of a variably tapped potentiometer 35.

The vertical convergence windings VR and VG of the respective red and blue convergence magnets (23 and 25) are directly tied at one end to the junction of variable resistor 19 and diode 21 in the first drive circuit. Bridging the opposite ends of the windings VR and VG are, in parallel, the resistance elements of potentiometers 27 and 29. The variable tap of potentiometer 27 is directly connected to the variable tap of the potentiometer 35 in the second drive circuit. A fixed resistor 37 links the variable tap of potentiometer 29 to the junction of capacitor 31 and resistor 33 in the second drive circuit.

The series combination of variable resistor 19 and diode 21 (in the first drive circuit) is shunted by (1) a fixed voltage divider formed by fixed resistor 41 and fixed resistor 43; and (2) an adjustable voltage divider comprising the potentiometer 45. The vertical convergence winding VB of the blue convergence magnet 49 is connected between the variable tap of potentiometer 45 and the junction of voltage divider resistors 41 and 43. Shunting the winding VB is the resistance element of a potentiometer 47, the variable tap of which is returned to the junction of capacitor 31 and resistor 33 in the second drive circuit.

Explanation of the operation of the FIGURE 1 circuit, and the functions performed by the controls it provides, will be undertaken in a step-by-step development of the circuit, aided by reference to the schematic series of FIGURES 2*a*–2*d*.

Figure 2A:
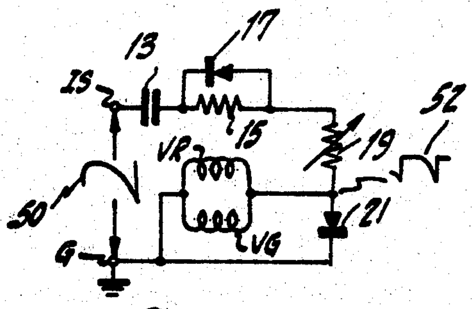

Considering initially the first drive circuit and the function of control 19, reference may be made to FIGURE 2*a*. The positive-going portion of input waveform 50, as passed by capacitor 13, causes conduction by diode 21. Such conduction causes severe attenuation of this waveform as presented across the windings VR, VG, with consequent absence of significant drive from this circuit during the beginning-of-scan interval. However, during the succeeding half of the vertical trace interval, diode 21 opens, and diode 17 conducts; the negative-going portion of the input waveform is presented across the windings with relatively little attenuation, and thus provides drive during the end-of-scan period. Conducting diode 17 in conjunction with resistor 15 shapes the input waveform for optimum bottom half convergence. Variable resistor 19 provides a master amplitude control for red-green winding current in the end-of-scan period, and thus is suitable for vertical line alignment at the raster bottom.

Figure 2B:
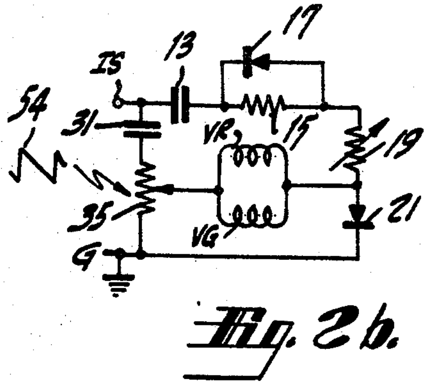

Next considering the addition of the second drive circuit and the function of control 35, reference may be made to FIGURE 2*b*. The second drive circuit serves to differentiate the partially integrated sawtooth input in order to provide a substantially sawtooth voltage across the resistance element. During the beginning-of-scan period, when diode 21 of the first drive circuit is conducting, the adjustable sawtooth voltage source represented by element 35 sees a low impedance load (comprising windings VR, VG in series with conducting diode 21), and therefore provides significant current drive through the windings. Potentiometer 35 provides a master amplitude control for red-green winding current in this beginning-of-scan period, and thus is suitable for vertical line alignment at the raster top. When diode 21 opens, the load seen by the second drive circuit rises to a high impedance value, and only a small degree of current control is afforded thereby.

Figure 2C:
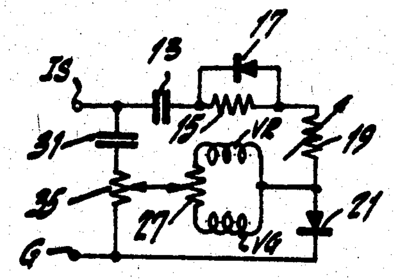

In FIGURE 2*c*, the addition of potentiometer 27 to the configuration of FIGURE 2*b* is shown. The potentiometer 27 provides a means for altering the division of current drive (from the first drive circuit) between the windings VR and VG, and accordingly provides a control for horizontal line alignment (the adjustment having a differential effect on the VR and VG currents) at the raster bottom (i.e., when the first drive circuit is controlling).

Figure 2D:
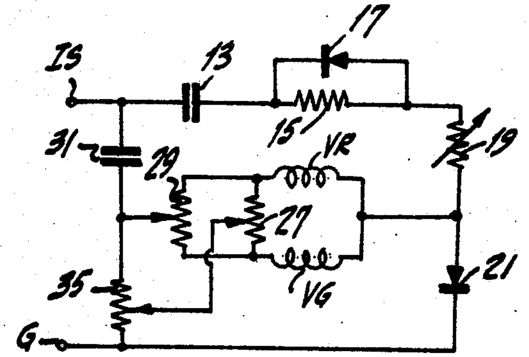

In FIGURE 2*d*, the addition of potentiometer 29 to the configuration of FIGURE 2*c* is shown. The presence of potentiometer 29 allows a differential voltage to be produced between the coils VR and VG during the first half of scan. As the tap (returned to the differentiated voltage source) is adjusted the currents of VR and VG are varied differentially. In the second half of scan, when diode 21 is not conducting, this control is relatively ineffective in view of the altered impedance conditions described in connection with control 35. Potentiometer 29 thus provides horizontal line alignment at the raster top.

The voltage across the series combination of resistor 19 and diode 21 is an attenuated version of the input during the first half of scan, and a relatively unattenuated version thereof during the second half of scan by reason of the diode action previously described. For control of blue convergence current at raster bottom, the winding VB is bridge between a fixed divider (41, 43) of such voltage wave and an adjustable divider thereof (provided by potentiometer 45). Tap adjustment to voltage division levels greater than that provided by the fixed divider results in blue convergence drive in one direction, while tap adjustment to division levels smaller than the fixed division results in reverse direction drive.

For control of blue convergence current at raster top, a voltage from the second drive circuit differentiator is supplied to winding VB via the potentiometer 47 bridged across it. Tap movement to one side of the electrical center of potentiometer 47 provides beginning half current drive of one polarity and tap movement to the other side results in reversing this drive.

Presented below, by way of example, is a table of values for the parameters of the FIGURE 1 circuit which may be employed to provide a satisfactorily operating circuit:

Capacitor 13—500 microfarads
Resistor 15—68 ohms
Diode 17—FDH600 (2 series connected)
Resistor 19—90 ohms (variable)
Diode 21—FDH600
Resistor 27—30 ohms (variable)

Resistor 29—90 ohms (variable)
Capacitor 31—65 microfarads
Resistor 33—33 ohms
Resistor 35—60 ohms (variable)
Resistor 37—56 ohms
Resistor 41—100 ohms
Resistor 43—100 ohms
Resistor 45—500 ohms (variable)
Resistor 47—500 ohms (variable)

What is claimed is:

1. In a color television receiver including a vertical deflection circuit providing a source of vertical rate waveforms, a convergence circuit comprising the combination of:

a pair of convergence windings;

first drive circuit means coupled to said source and to one end of each of said pair of windings for energizing said windings and including means for substantially restricting said energization to only one half of the vertical scan interval; and second drive circuit means coupled to said source and to the opposite ends of said winding for developing a driving voltage during both halves of the vertical scan interval;

said restricting means serving in its operation to alter the load presented to said second drive circuit means in the respective halves of the vertical scan interval in such manner that said second drive circuit means effectively controls energization of said windings only during the remaining half of the scan interval.

2. In a color television receiver including a vertical deflection circuit providing a source of vertical rate waveforms, a convergence circuit comprising the combination of:

a pair of convergence windings;

first drive circuit means coupled to said source and to one end of each of said pair of windings for energizing said windings and including means for substantially restricting said energization to only one half of the vertical scan interval; and second drive circuit means coupled to said source and to the opposite ends of said windings for developing a driving voltage during both halves of the vertical scan interval;

said restricting means serving in its operation to alter the load presented to said second drive circuit means in the respective halves of the vertical scan interval in such manner that said second drive circuit means effectively controls energization of said windings only during the remaining half of the scan interval;

means associated with each drive circuit means for varying the energization controlled thereby in both windings in the same sense;

and means associated with each drive circuit means for varying the energization controlled thereby in both windings in mutually opposing sense.

3. Apparatus in accordance with claim 2 wherein said first drive circuit means includes, in combination;

the parallel combination of a first diode and a first resistor;

a second resistor;

a second diode;

means for serially connecting said parallel combination, said second resistor and said second diode, in the order named, across said source of vertical rate waveforms, said first and second diodes being oppositely poled in the series connection across said source, said one end of each of said pair of windings being connected to the junction of said second resistor and said second diode, with said second diode, in cooperation with said first and second resistors, serving as said means for substantially restricting energization of said windings by said first drive circuit means to said one half of the vertical scan interval.

4. Apparatus in accordance with claim 3 wherein said second drive circuit means includes, in combination;

a capacitor;

a resistive impedance;

means for connecting said capacitor and said resistive impedance in series across said source of vertical rate waveforms, said opposite ends of said windings being coupled to a point on said resistive impedance.

5. A vertical rate convergence circuit comprising the combination of:

a source of vertical rate voltage waves;

a network shunted across said source and including the series combination of resistive means and a diode poled to conduct during a predetermined portion of the cycle of said vertical rate waves;

a convergence magnet winding;

and means for effectively shunting said winding across said diode whereby said network energizes said winding only during those other cycle portions when the diode is nonconducting.

6. A convergence circuit in accordance with claim 5 also including a fixed voltage divider shunted across said series combination;

a potentiometer presenting a resistance element between respective end terminals, and having an adjustable tap;

means for shunting said resistance element across said series combination;

a second convergence winding;

and means for connecting said second winding between said tap and an intermediate point on said fixed voltage divider whereby tap adjustment may vary both sense and magnitude of the energization of said second winding primarily during said other cycle portions.

7. Apparatus in accordance with claim 5 wherein means are provided to vary the resistance exhibited by said resistive means to control the magnitude of said energization during said other cycle portions.

8. Apparatus in accordance with claim 7 wherein a second source of vertical rate voltage is effectively included in series with said winding across said diode, said second source effectively controlling energization of said winding only during the cycle portion when said diode is conducting.

9. A convergence circuit in accordance with claim 8 also including a fixed voltage divider shunted across said series combination;

a potentiometer presenting a resistance element between respective fixed terminals, and having an adjustable tap;

means for shunting said resistance element across said series combination;

a second convergence winding;

means for connecting said second winding between said tap and an intermediate point on said fixed voltage divider whereby tap adjustment may vary both sense and magnitude of the energization of said second winding primarily during said other cycle portions;

a second potentiometer presenting a resistance element between respective fixed terminals, and having an adjustable tap;

means for shunting said resistance element of said second potentiometer across said second convergence winding;

and means for coupling the adjustable tap of said second potentiometer to said second source of vertical rate voltage whereby adjustment of the tap of said second potentiometer may vary both sense and magnitude of the energization of said second winding during said first-named, predetermined cycle portions.

10. In a color television receiver including a vertical deflection circuit providing a source of vertical rate waveforms, a convergence circuit comprising the combination of:

(a) a pair of convergence windings;

(b) first drive circuit means coupled to said source and to one end of each of said pair of windings for energizing said windings, said first drive circuit means including:

(1) the parallel combination of a first diode and a first resistor;

(2) a second resistor;

(3) a second diode; and (4) means for serially connecting said parallel combination, said second resistor and said second diode across said source of vertical rate waveforms, said first and second diodes being oppositely poled in the series connection across said source, said one end of each of said pair of windings being connected to the junction of said second resistor and said second diode, with said second diode, in cooperation with said first and second resistors, serving as means for substantially restricting energization of said windings by said first drive circuit means to one half of the vertical scan interval;

and (d) second drive circuit means coupled to said source and to the opposite ends of said windings for developing a driving voltage during both halves of the vertical scan interval;

said restricting means serving in its operation to alter the load presented to said second drive circuit means in the respective halves of the vertical scan interval in such manner that said second drive circuit means effectively controls energization of said windings only during the remaining half of the scan interval.

References Cited

UNITED STATES PATENTS

| | | | |
|---|---|---|---|
| 2,875,374 | 2/1959 | Cooper et al. | 315—13 |
| 3,163,797 | 12/1964 | Singleback. | |
| 3,258,643 | 6/1966 | Lemke. | |

RODNEY D. BENNETT, Jr., Primary Examiner

MALCOLM F. HUBLER, Assistant Examiner